United States Patent [19]
Garrigues et al.

[11] 3,970,468
[45] July 20, 1976

[54] SULFUR EMULSION IN BITUMINOUS MATERIAL

[75] Inventors: Claude Garrigues, Noisy-le-Grand; Jean Baptiste Signouret; Claude Chambu, both of Billere, all of France

[73] Assignee: Societe Nationale des Petroles d'Aquitaine, Paris, France

[22] Filed: May 14, 1974

[21] Appl. No.: 469,769

[30] Foreign Application Priority Data
May 24, 1973 France .............................. 73.18842

[52] U.S. Cl. .............................. 106/274; 106/277; 404/32; 404/79
[51] Int. Cl.² .................. C08L 95/00; E01C 5/12
[58] Field of Search ...... 106/274, 275, 277, 287 SC; 252/311.5, 358; 260/28, 28.5 AS; 404/32

[56] References Cited
UNITED STATES PATENTS

| | | | |
|---|---|---|---|
| 2,602,029 | 7/1952 | Bradshaw .................... | 106/274 X |
| 3,738,853 | 6/1973 | Kopvillem et al. .................... | 106/274 |
| 3,803,066 | 4/1974 | Petrossi ........................... | 260/28.5 AS |
| 3,808,020 | 4/1974 | Pitchford ............................ | 106/277 |

OTHER PUBLICATIONS

Abraham, Asphalts and Allied Substances, 6th Ed. vol. 3, Published by D. VanNostrand Co. Inc., Princeton, New Jersey, 1962 (pp. 35–38 relied on).

*Primary Examiner*—Joan E. Welcome
*Attorney, Agent, or Firm*—Ostrolenk, Faber, Gerb & Soffen

[57] ABSTRACT

Process for dispersing molten sulphur in a hydrocarbon material, such as asphalt, tar and more particularly bitumen. The dispersion is effected in such a way as to produce an emulsion of sulphur in very fine particles, with dimensions not exceeding 10 microns, in the hydrocarbon material. A turbine with a gap or clearance of about 0.1 to 2.25 mm. is very useful for this purpose. The emulsions obtained are particularly suitable for road surfaces.

12 Claims, No Drawings

SULFUR EMULSION IN BITUMINOUS MATERIAL

The present invention relates to a new process for obtaining emulsions of sulphur in asphalt, bitumen, tar or similar hydrocabon material. It also comprises the new stable compositions of sulphur finely dispersed in such materials.

The incorporation of sulphur into bitumens, asphalts, tars or pitches has been carried out for a long time, and various compositions of carbonaceous masses with sulphur have been described in the literature. One of their main applications is the surfacing of roads, of which the properties can be improved by the presence of the sulphur. The compositions described are generally of three types: the first type is modified by the chemical action of the sulphur, following a strong heating; another type contain a solution and/or dispersion of sulphur particles in the hydrocarbon composition; finally, when the sulphur content greatly exceeds that of the asphalt, it is a coarse dispersion of hydrocarbon material and sulphur. The best mechanical and rheological properties would be obtained when the content of sulphur is, according to the authors, of the order of about 10% up to 400% relative to the weight of hydrocarbon material. For example, indications are given in French Pat. No. 1,444,629, according to which the supporting power of a road surface is considerably improved when the ratio by weight between sulphur and bitumen reaches 2.2; similar results become apparent from French Pat. No. 7,135,808; on the other hand, U.S. Pat. No. 2,182,837 recommends particularly contents of sulphur which are from 33 to 100%, relative to the bitumen.

It has become apparent from research carried out by the Applicants that the contradictions between the different results of the prior art and the dispersion found in the mechanical and rheological properties originate for a large part from the heterogeneity of the compositions which have so far been used. It was in fact found that, in a bituminous composition prepared with more than 15% of sulphur, the precipitation of this element occurs within the composition in the long run, this being shown by a fall in the mechanical properties of the surface covering. Although about 15% by weight of sulphur remain dissolved in the hydrocarbon material, the excess of this element can only be found in the state of a dispersion or possibly in a supersaturated form; when the incorporation of the sulphur into the hydrocarbon material is effected under heat, the sulphur, in a more or less imperfect supersaturated or dispersion form experiences physical transformations during the cooling, and this explains the disadvantageous modifications which are produced during the ageing of the compositions according to the prior art. This is the reason why the surface coverings based on bitumen and sulphur, with a high content of this latter, are not satisfactory.

According to the present invention, it is not necessary to incorporate very high proportions of sulphur into the carbonaceous materials, such as bitumens, asphalts, tars, etc., but it is necessary to disperse this metalloid in a manner which is as perfect as possible in the form of particles not exceeding 10 microns. It is then that a true fine emulsion of the liquid sulphur in the liquid or pasty hydrocarbon material which is achieved according to the present invention.

When the aforementioned conditions are complied with, the masses which are obtained have good homogeneity and show a surprising stability as a function of time and within a wide temperature range, contrary to what happens with the products of the prior art. Thus, it is established that the dispersions prepared according to the invention can be solidified, cooled, then reheated and remelted numerous times without any change; they can be handled at 150°C without any release of hydrogen sulphide, that is to say, without dehydrogenation of the bitumen by the sulphur. These products thus have properties which can be reproduced, similar to those of bitumen without sulphur.

On the other hand, the emulsions according to the invention have the advantage of a lower viscosity than that of the pure bitumen in the region of 140°C, and this makes them capable of easier handling. Contrary to the known products, the dispersions according to the invention, in the solid state, do not lead to any separation of the sulphur after three years.

Another very important advantage of the new compositions is their increased resistance to formation of grooves or ruts, as compared with a bituminous concrete having the same granulometric curve. The emulsions according to the invention are also particularly well suited for the preparation of bituminous coatings; in addition, they permit excellent coverings on surfaces to be obtained with soft bitumens (penetration for example 80–100, 100–120 or 180–200-ASTM-D5), that is to say, with bitumens which are too fluid for numerous conventional uses; thus, according to the invention, such bitumens having high penetration can be used for obtaining compact bituminous concretes which present the same properties as the conventional concretes obtained with bitumens of low penetration (20–30); it is to be noted that that the usual conditions for the application of these latter are much more difficult (200°C) than those of the new products according to the invention, made from bitumens of strong penetration (140°C). As will be seen, the advantages of the products according to the invention are due to the fact that the new products, when hot, are more fluid than the usual bitumens of low penetration, but are more resistant to cold.

Although the proportion of sulphur relative to the hydrocarbon material can vary within wide limits within the scope of the invention, it is preferably from 15 to 100 parts by weight to 100 parts of hydrocarbon materials and, better still, about 20 to 45 parts by weight.

As already indicated above, the particles of dispersed sulphur must have an average dimension which is equal to or smaller than 10 microns: it is of interest for them to be as small as possible, but in practice it is sufficient for them to be between 0.5 and 5 microns.

In order to obtain an emulsion of sulphur in a hydrocarbon material, such as bitumen, asphalt, etc., a mixture of sulphur melted with the hydrocarbon material is subjected to a dispersing agitation. So that the sulphur is liquid, it is obviously necessary to work above 120°C, but the upper limit as regards temperature is controlled by the nature of the hydrocarbon material and by the transition temperature at which the liquid sulphur becomes very viscous ($\mu$ sulphur). In the practical case of dispersions of sulphur in bitumen for roads, the emulsion can be prepared between 125° and 200°C, the mean temperature which is preferred being about 130° to 170°C and better still 150° to 160°C.

In order to achieve the high degree of dispersion which is necessary according to the invention, it is possible to employ appropriate devices for the emulsion of liquids. However, it was found, within the scope of the present invention, that the preparation of such an emulsion is fairly difficult; it has been possible to obtain this emulsion by means of a conventional turbine, provided that the latter is adapted in a certain special manner.

According to one important feature of the present invention, the emulsion of the sulphur in bitumen is formed by the sulphur-bitumen mixture being passed through a turbine, of which the clearance is between 0.1 and 2.25 mm and more particularly between 0.4 and 1.15 mm. Moreover, with a view to obtaining the best possible result, the dimension of the clearance should be regulated as a function of the proportion of sulphur relative to bitumen.

Generally speaking, a larger clearance is chosen as the proportion of sulphur to be dispersed is increased. It is suitable to regulate the speed of rotation of the turbine, on the one hand, and the size of the clearance, on the other hand, in such a way that the compression in the clearance does not reach that at which the sulphur is transformed into $\mu$ sulphur. In other words, it is necessary to have lower speeds for the smaller clearances, and vice versa.

Thus, it has been possible to obtain excellent results with a Moritz turbine of the BF 50 V type with an adjustable clearance, used with a speed of the grinding cone of 7400 rpm; it has been possible in this way to obtain very stable emulsions of 13 to 25 parts of sulphur to 100 parts of bitumen (penetration 80–100) with clearances from 0.3 to 0.5 mm.

In an improved form of the invention, a sulphur-bitumen mixture is first of all prepared in an apparatus producing a strong dispersion, for example, in a turbo-emulsifier, and the dispersion obtained is treated in a turbine having a suitably adjusted clearance; the operation of the turbine is thus facilitated. Obviously, if it should be neccesary, an emulsion can be passed several times through the turbine for achieving the degree of dispersion, that is to say, the desired smallness of the sulphur droplets. For this purpose, the process according to the invention can be carried out in an assembly of several turbines, or turbines and turbo-emulsifiers arranged in series.

In the non-linking examples which are hereinafter described, there was used the Moritz turbine, BF 50 V type, with an adjustable clearance, a capacity of 3 liters and driven by a 1.75 h.p. motor; the speed of the grinding cone was adjustable from 7000 to 13000 rpm. The bitumen and the sulphur were introduced simultaneously in the required proportion into the rotating turbine. The temperature on entering the turbine was from 140° to 190°C, according to the tests, whereas the product leaving the turbine was at 110° to 140°C; it is the average between the entry temperature and the outlet temperature which is considered as the working temperature as defined above. The product leaving the turbine was recycled into the inlet to the turbine, so as to be subjected to the emulsifying action for three minutes.

In other examples, the turbine referred to above was supplied with a mixture of sulphur and bitumen previously emulsified in a Moritz turbo-emulsifier for 3 minutes; in this case, there was no longer any recycling, but a single passage through the BF 50 V turbine. In the following, the sulphur is indicated by S and the bitumen by B.

EXAMPLE 1

Variations in the viscosity of the bitumen-sulphur mixtures

A series of samples of an emulsion of S (I to IV) in bitumen of penetration 80–100 was prepared in the Moritz turbine previously described, with a clearance of 0.56 mm and between 160° and 120°C.

On the other hand, the bitumen alone (VI) is passed through the turbine under the same conditions. Viscosity measurements are carried out on the product as obtained, and also on a control mixture (V) prepared by simple agitation of 33.3 parts of molten S with 100 parts of the same bitumen, between 120° and 160°C.

The results, especially the logarithm of the viscosities in cps, are given in the following Table 1.

TABLE 1

|     |                      | S/100B | 80°C | 120°C | 160°C |
|-----|----------------------|--------|------|-------|-------|
| I   | Emulsion             | 11     | 3.45 | 2.66  | 1.90  |
| II  | Emulsion             | 25     | 4.04 | 2.76  | 1.78  |
| III | Emulsion             | 33.3   | 4.32 | 2.83  | 1.86  |
| IV  | Emulsion             | 43     | 4.65 | 2.90  | 1.92  |
| V   | Conventional mixture* | 33.3  | 3.62 | 2.97  | 2.29  |
| VI  | Bitumen alone        | 0      | 3.93 | 2.91  | 2.33  |

*the mixture is heterogeneous.

It is of interest to note that the viscosities of the emulsions I to IV according to the invention vary much more as a function of the temperature than those of the bitumen alone and the viscosity of a conventional bitumen-sulphur mixture. It is in fact found that, as regards the emulsions II to IV, that is to say, more than 11 parts of sulphur to 100 parts of bitumen, the composition is much more solid in the cold (viscosity at 80°C much higher) than are the conventional mixture V and the bitumen alone VI. On the contrary, at high temperatures, particularly in the region of 160°C, at which the shaping of the bituminous compositions is effected, the viscosity of the emulsions I to IV according to the invention is much lower than that of the conventional mixture and of the bitumen alone. The result is that hot working is greatly facilitated with a better behaviour in the cold.

For products similar to those of Example 1, but treated first of all in a Moritz tube-emulsifier for 3 minutes and then introduced into the BF 50 V turbine, the results are of the same order as in Table 1, with an even more accentuated difference between 80° and 160°C, for the emulsions according to the invention.

EXAMPLE 2

Cohesivity of the sulphur-bitumen compositions

The cohesivity in $kg/cm^2$ was established in respect of a series of emulsion samples prepared according to the invention as in Example 1, but with a clearance of 0.4 mm.

Table 2 contains the values found for −33°C, +5°C and +55°C.

TABLE 2

| S/100B | −33°C | +5°C | +55°C |
|--------|-------|------|-------|
| 0      | 0.28  | 1.58 | 2.25  |
| 5.25   | 0.32  | 1.25 | 2.64  |
| 11.0   | 0.46  | 1.23 | 6.12  |
| 17.7   | 1.24  | 2.00 | 6.32  |

TABLE 2-continued

| S/100B | −33°C | +5°C | +55°C |
|---|---|---|---|
| 25.0 | 0.68 | 1.86 | 5.72 |
| 33.3 | 0.92 | 2.56 | 4.42 |
| 43.0 | 1.10 | 1.99 | 5.67 |
| 43.0 conventional composition | 0.43 | 1.73 | 4.26 |

It can be seen that the behaviour of the compositions according to the invention is considerably improved relative to that of the bitumen to which S is not added, and relative to a conventional composition; this improvement is particularly noticeable for S contents exceeding 11% relative to the bitumen. This advantage is very important for the very low temperatures (−33°C), as also for Summer temperatures, of the order of 55°C, to which road surfaces are often brought.

EXAMPLE 3

Cohesivity as a function of the size of the clearance in the turbine

The tests at −33°C, related to Table 2, with the emulsions according to the invention, were repeated for emulsion samples prepared with variable clearances in the same turbine.

The cohesivities found are as follows:

TABLE 3

| | Clearance: | | |
|---|---|---|---|
| S/100 B | 0.15 mm | 0.4 mm | 1.15 mm |
| 11 | 0.27 | 0.46 | 0.56 |
| 17.7 | 0.77 | 1.24 | 0.90 |
| 33.3 | 0.85 | 0.92 | 0.90 |
| 43.0 | 0.39 | 1.10 | 0.63 |

It can be seen that, for the emulsions with 17 to 43 parts of sulphur to 100 parts of bitumen, the maximum of cohesivity is with a clearance of 0.4 mm. On the other hand, with 11 parts of sulphur, it is the clearance of 1.15 mm which seems to be most favourable. It is seen that the suitable adjustment of the clearance for a given emulsion effectively represents an important factor in accordance with the present invention.

We claim:

1. The method of producing a stable emulsion of sulfur in a material selected from the group consisting of bitumens, asphalts, pitches and tars, wherein 15 to 45 parts by weight of molten sulfur are mixed at about 125°C to about 160°C with 100 parts by weight of said material under stirring, the stirring being carried out so as to disperse the molten sulfur, throughout said material, in the form of droplets the dimensions of which are between about 0.5 and 10 microns, the fluid mass thus obtained being then formed to a required shape and allowed to cool until it becomes solid.

2. Method according to claim 1, wherein the average dimension of the droplets is of about 0.5 to about 5 microns.

3. Method according to claim 1, wherein the stirring is carried out by passing the mixture of sulfur with said material through the gap between the stator and the rotating rotor of a turbine, said gap being comprised between 0.1 and 2.25 mm.

4. Method according to claim 3, wherein said gap is 0.4 to 1.15 mm.

5. Method according to claim 4, wherein the rotor rotates at 7 000 to 13 000 r.p.m.

6. Method according to claim 1, wherein the temperature is about 130° to about 170°C.

7. Method according to claim 3, wherein said mixture enters the turbine when at about 140° to about 160°C and leaves the turbine at about 110° to about 140°C.

8. Method according to claim 3, wherein said mixture is passed several times through the gap between the stator and the rotating rotor of a turbine.

9. Method according to claim 1, wherein a mixture of sulfur with said material is first subjected to a primary dispersion and then the product obtained is passed through a gap of 0.1 to 2.25 mm between the stator and the rotating rotor of a turbine.

10. Method according to claim 4, wherein the proportion of sulfur is 20 to 45 parts by weight for 100 parts by weight of said material.

11. The composition of matter produced by the method according to claim 1, which comprises a solid mass of a material selected from the group consisting of bitumens, asphalts, pitches and tars, containing uniformly dispersed therein sulfur particles the dimensions of which are in the range of 0.5 to 10 microns, the amount of sulfur being of 15 to 45 parts by weight per 100 parts by weight of said material, and the viscosity of the mass at 80°C being substantially stronger than the viscosity at 80°C of the corresponding material when it does not contain sulfur.

12. A road paving composition produced by dispersing molten sulfur in bitumen at about 130°C to about 170°C, casting the dispersion onto the road and allowing it to cool, wherein the proportion of sulfur is 20 to 45 parts by weight per 100 parts by weight bitumen the sulfur is in the form of particles uniformly dispersed throughout the bitumen and having an average dimension of 0.5 to 5 microns, the viscosity of the coating at 80°C is substantially higher than the viscosity at 80°C of the same bitumen when it does not contain sulfur, while the viscosity at 160°C at the coating is substantially lower than that of the sulfurfree bitumen at 160°C.

* * * * *

UNITED STATES PATENT AND TRADEMARK OFFICE
CERTIFICATE OF CORRECTION

PATENT NO. : 3,970,468
DATED : July 20, 1976
INVENTOR(S) : Claude Garrigues, et al It is certified that error appears in the above-identified patent and that said Letters Patent are hereby corrected as shown below:

Column 3, line 48, for "non-linking" read --non-limited--.

Column 5, line 52, for "160" read --170--.

Column 6, line 17, for "170" read --160--; line 54, for "sulfurfree" read --sulfur-free--.

Signed and Sealed this

Eleventh Day of January 1977

[SEAL]

Attest:

RUTH C. MASON
Attesting Officer

C. MARSHALL DANN
Commissioner of Patents and Trademarks